Figures 1, 2, 3, 4:
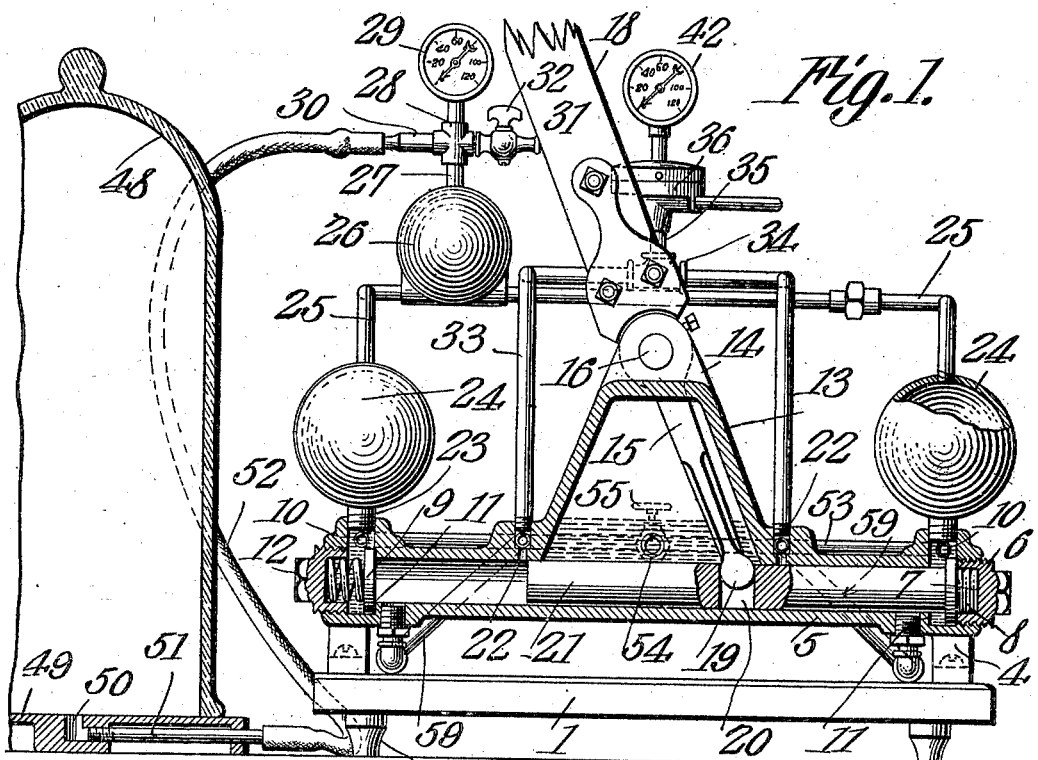

J. S. HEMENWAY.
AIR PUMP.
APPLICATION FILED MAR. 17, 1909.

951,529.

Patented Mar. 8, 1910.

Inventor
Justin S. Hemenway.

Witnesses

By C. A. Snow & Co.
Attorneys

UNITED STATES PATENT OFFICE.

JUSTIN S. HEMENWAY, OF RIVER FALLS, WISCONSIN.

AIR-PUMP.

951,529.  Specification of Letters Patent.  Patented Mar. 8, 1910.

Application filed March 17, 1909. Serial No. 483,923.

*To all whom it may concern:*

Be it known that I, JUSTIN S. HEMENWAY, a citizen of the United States, residing at River Falls, in the county of Pierce and State of Wisconsin, have invented a new and useful Air-Pump, of which the following is a specification.

This invention relates to air pumps of that type especially designed for use by students in physical laboratories and the like, and it constitutes an improvement upon the structure described and claimed in Patent No. 756,630, issued to me on April 5, 1904.

The object of the invention is to provide a neat and durable device of this character constructed of few parts and which cannot readily get out of order, the pump being useful both for compressing and exhausting air.

A further object is to provide a pump having a piston which also constitutes a valve for controlling the intakes of the pump cylinder, means being utilized whereby this piston, as well as the valves at the outlets to the cylinder are permitted to work in oil and thus absolutely prevent leakage at these points.

A further object is to provide a shut-off valve of novel form for use in connection with the pump and whereby the supply of air to the intakes may be readily controlled.

Another object is to provide a valve especially designed for use in connection with large pumps and whereby the resistance offered to the actuation of the piston while being used for compressing purposes, may be reduced to the minimum.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a longitudinal section through the casing of the pump, the piston being shown partly in section and the valves and tubes being shown in elevation. Fig. 2 is a plan view of the apparatus, the lever being broken away. Fig. 3 is a perspective view of the cut-off valve, the two parts thereof being shown separated. Fig. 4 is a section of the auxiliary valve designed to be used in connection with large pumps of this character.

Referring to the figures by characters of reference 1 designates a base supported in any suitable manner, as upon feet 2, a portion of this base constituting a platform 3 on which the operator may stand. Brackets 4 are mounted on the end portions of the base at one side of the platform 3 and these brackets support the end portions of the pump cylinder or casing 5, the ends of which are closed by means of screw caps or heads 6 having recesses 7 in their inner ends. These recesses constitute seats for springs 8 which bear against disks 9 constituting valves for normally closing the outlet ports 10 of the cylinder. Interior annular shoulders 11 are formed within the end portions of the cylinder 5 and constitute seats for the valve disks 9, said disks, when bearing upon these seats, serving to close the ports 10 as clearly indicated at the left of Fig. 1. The heads 6 are preferably formed with angular extensions 12 which may be engaged by a wrench for the purpose of adjusting said heads with relation to the cylinder 5.

Extending upwardly from the middle portion of the cylinder 5 and opening into said cylinder is a housing 13 from the upper end of which extend ears 14. A rock-arm 15 extends through an aperture in the top of the housing 13 and is fulcrumed upon a pivot pin 16 extending through the ears 14. The upper or outer end of this arm has a socket 17 constituting a seat for the lower end of an actuating lever 18. The lower end of the rock-arm 15 is rounded as indicated at 19 and projects into an opening 20 extending through the middle portion of an elongated cylindrical piston 21. This piston fits snugly within the cylinder 5 and serves to maintain the bottom of the housing 13 closed at all times. Intake ports 22 are formed in the cylinder 5 adjacent opposite portions of the housing 13, and these ports are so positioned that when the piston has reached the limit of its movement in one direction it exposes one of the ports, while the other port 22 is closed thereby. As soon as the piston begins its return movement it closes the previously exposed port, and, immediately prior to reaching the limit of such movement, it opens the other port 22.

Each of the outlet ports 10 is connected by means of a short tube 23 with a hollow globe 24, the two globes communicating through pipes 25 with the interior of a globe 26 the outlet 27 of which is connected to a cross fitting 28, one arm of which is provided with a pressure gage 29 of the ordinary or any preferred construction. The other arms of this fitting are provided with nozzles 30 and 31, the nozzle 31 being preferably provided with a cock 32 for controlling the passage of air therethrough.

The intake ports 22 of cylinder 5 are connected by pipes 33 with a T fitting 34, one arm of which communicates through a short pipe 35 with the interior of a valve head 36. This head is preferably circular in form and its flat upper face is provided with a central boss 37, while formed within this face are three apertures 38, 39 and 40. The aperture 38 opens into the head 36 and thus communicates with the pipe 35. The aperture 40 however opens into one end of a pipe 43 extending radially from the head 36 and having a vacuum gage 42 mounted thereon. Another pipe 41 discharges through the head 46 at the opening 40. The other head of the valve consists of a disk 44 having a central recess 45 for the reception of the boss 37, and formed within the lower or working face of this disk 44 is an arcuate groove 46 designed to establish communication between any two adjoining openings 38, 39 and 40. This head 44 may be shifted by means of arms 47 extending radially therefrom. The disk 44 rests loosely upon the flat upper face of the head 36, the meeting faces of the two members being preferably flat and said members being held firmly together by external atmospheric pressure. Leakage may be prevented by applying hard oil to the meeting faces of the members before said members are assembled.

The bell jar 48 used in connection with the pump may be of the usual or any preferred construction, but the base 49 thereof has a central opening 50 into which projects a radial tube 51 one end of which extends beyond the margin of the base. This end of the tube has a flexible hose 52 connected to it and this hose may be attached to either of the nozzles 30 or 31 or to either of the pipes 41 and 43, according to the operation to be performed.

As has heretofore been stated the piston 21 and the lower portion of arm 15 are designed to work in oil. The oil is placed in the housing 13 and in the outlet ports 10 in any preferred manner and may be maintained at the same level at these points by connecting the ports 10 by means of a pipe 53, there being a branch pipe 54 connecting the pipe 53 with the interior of the housing 13. A globe valve 55 may be arranged within the pipe 54 for shutting off oil from the housing 13 if so desired.

When it is desired to compress air within a pressure tank, the parts are arranged as indicated in Fig. 1, hose 52 being connected to the nozzle 30. By oscillating the lever 18 the piston 21 will be caused to reciprocate, and, as it begins one stroke, it will act as a valve to close one of the intakes 22 and just prior to reaching the limit of such stroke it will open the other intake 22. The air will thus rush into the cylinder 5 and destroy the partial vacuum produced by this movement of the piston, this air entering the tube 43 and passing from opening 40 through groove 46 to the opening 38 from which it travels along the tubes 35 and 33 to the cylinder 5. Upon the return stroke of the piston the air in the path thereof will be forced against valve disk 9 so as to unseat it, whereupon the air will pass outwardly through the ports 10 and globes 24 and 26 to nozzle 30, and thence into the tank. It will be seen that the pump is double-acting inasmuch as air is forced into the bell at each stroke of the piston. The pressure of air within the bell will be accurately indicated by the member 29.

Should it be desired to exhaust air from a bell jar 48 the hose 52 is connected to either tube 41 or tube 43. When it is desired to ascertain the condition of the partial vacuum produced it is desirable to connect the hose 52 to the tube 43 on which the indicator 42 is mounted. The valve member 44 is then adjusted so as to place the openings 38 and 40 in communication. When the piston 21 is reciprocated in the manner hereinbefore described a partial vacuum is produced in the wake thereof during each stroke until said stroke has been almost completed whereupon the intake port 22 will be opened and the air will be free to rush into said partial vacuum and destroy it. This will of course correspondingly rarefy the air contained within the bell jar. Upon the return stroke of the piston the air in the path thereof will be expelled into the exterior atmosphere through the valved outlet ports 10 and the globes 24 and 26.

Importance is attached to the fact that the valves 9 and the piston 21 work in oil, because this oil serves to positively close any minute openings which might otherwise occur and therefore leakage of air past the valves or piston is prevented.

In the larger types of pumps of this character it is desirable to utilize auxiliary valves and connections for reducing to the minimum the power necessary to operate the pump. For example, during the operation of forcing air into a pressure tank or the like a partial vacuum is produced during the greater portion of each stroke of the piston. This, in addition to the resistance offered by the air being forced, serves to greatly retard the action of the piston. In order to prevent the formation of a partial vacuum during the forcing operation a check valve 56 may be arranged within each end portion of cylinder 5 and close to the valve seat 11, each of these check valves preferably consisting of an apertured disk 57 normally held by gravity upon its seat 58. The casing of the valve is connected by means of a pipe 59 with the intake port 22. It will be apparent therefore that when the piston 21 is shifted in one direction during the operation of forcing air, the air entering the pump through the tubes or pipes 33 is not held back until the piston almost reaches the end of its stroke, but is free to promptly enter the cylinder and back of the piston through the casing of the valve 57. During the exhausting action of the pump this auxiliary valve will have effect only as long as the pressure of the air in the receiver is sufficient to lift the valve. As soon as the air in the receiver has become too rare to open the valves said valves will remain dormant while the exhaustion is completed through ports 22.

It is of course to be understood that various changes may be made in the construction and arrangement of the parts without departing from the spirit or sacrificing the advantages of the invention.

What is claimed is:—

1. A pump comprising a cylinder having intakes, there being outlets adjacent the ends of the cylinder, valves for normally closing said outlets, a piston mounted to reciprocate within the cylinder and controlling the intakes, a housing opening into the cylinder and closed by the piston, said housing and the outlet ports constituting receptacles for a sealing liquid.

2. A pump comprising a cylinder having intakes, there being outlets adjacent the ends of the cylinder, valves for normally closing the outlets, a piston mounted to reciprocate within the cylinder and controlling the intakes, a housing opening into the cylinder and closed by the piston, said housing and the outlet ports constituting receptacles for a sealing liquid, and means for maintaining the liquid within said housing and the ports constantly at the same level.

3. A pump comprising a cylinder, said cylinder having intakes and outlet ports, valves for normally closing the outlet ports, a piston mounted to reciprocate within the cylinder and controlling the intakes, a housing opening into the cylinder and closed at the bottom by the piston, said housing and the outlet ports constituting receptacles for a sealing fluid, and means mounted to oscillate within the housing for actuating the piston.

4. A pump comprising a cylinder having intakes, there being outlets adjacent the ends of the cylinder, valves for normally closing said outlets, an elongated cylindrical piston mounted to reciprocate within the cylinder, said piston alternately opening the intakes during the completion of its respective strokes, said intakes being maintained closed at other times by the piston, a housing opening into the cylinder and closed by the piston, said housing and the outlet ports constituting receptacles for a sealing liquid.

5. A pump comprising a cylinder having intakes, there being outlets adjacent the ends of the cylinder, valves for normally closing said outlets, an elongated cylindrical piston mounted to reciprocate within the cylinder, said piston alternately opening the intakes during the completion of its respective strokes, said intakes being maintained closed at other times by the piston, a housing opening into the cylinder and closed by the piston, said housing and the outlet ports constituting receptacles for a sealing liquid, and means for maintaining the liquid within said housing and ports constantly at the same level.

6. A pump comprising a cylinder, said cylinder having intakes and outlet ports, a housing opening into the cylinder, valves for normally closing the outlet ports, a piston for alternately opening the intakes during the completion of its respective strokes, said intakes being maintained closed at other times by the piston, and said piston constituting the closure for the bottom of the housing, said housing and the outlet ports constituting receptacles for a sealing fluid, and means mounted to oscillate within the housing for actuating the piston.

7. A pump comprising a cylinder having a housing thereon and opening thereinto, there being intake ports adjacent the housing and outlet ports adjacent the ends of the cylinder, a piston mounted to reciprocate within the cylinder, said piston operating to alternately open the intake ports during the completion of its respective strokes, means mounted to reciprocate within the housing for actuating the piston, non-communicating intake pipes, means for establishing communication between either of said pipes and both intake ports, a discharge nozzle, and tubular connections between said nozzle and the outlet ports.

8. A pump comprising a cylinder having a housing thereon and opening thereinto, there being inlet ports adjacent the housing and outlet ports adjacent the ends of the cylinder, valves for normally closing the outlets, a piston mounted to reciprocate within the cylinder, said piston constituting a closure for the housing and alternately opening the inlet ports during the completion of the respective strokes of the piston, oscillating means within the housing for actuating the piston, said housing and the outlet ports constituting receptacles for a sealing fluid.

9. A pump comprising a cylinder having inlet and outlet ports, a piston mounted to reciprocate within the cylinder for alternately opening the inlet ports during the completion of the respective strokes of the piston, and valved extensions for establishing communication between the inlet ports and the end portions of the cylinder.

In testimony that I claim the foregoing as my own, I have hereto affixed my signature in the presence of two witnesses.

JUSTIN S. HEMENWAY.

Witnesses:
W. G. SPENCE,
H. E. NELSON.